United States Patent
Lee et al.

(10) Patent No.: US 6,588,310 B2
(45) Date of Patent: Jul. 8, 2003

(54) SAW BLADE SHANK

(75) Inventors: Chang Hyun Lee, Pyongtaek-Si (KR); Joon Ho Chang, Gunsan-Si (KR)

(73) Assignee: EHWA Diamond Ind. Co., Ltd., Kyongki-Do (KR)

( * ) Notice: Subject to any disclaimer, the term of this patent is extended or adjusted under 35 U.S.C. 154(b) by 0 days.

(21) Appl. No.: 09/891,052

(22) Filed: Jun. 25, 2001

(65) Prior Publication Data

US 2002/0112589 A1 Aug. 22, 2002

(30) Foreign Application Priority Data

Feb. 19, 2001 (KR) .......................................... 2001-8262

(51) Int. Cl.$^7$ .............................................. B27B 33/14
(52) U.S. Cl. .............................. 83/835; 83/676; 30/350
(58) Field of Search .......................... 83/676, 833–855, 83/666, 665; 30/350, 347, 345; 125/15

(56) References Cited

U.S. PATENT DOCUMENTS

| | | | |
|---|---|---|---|
| 1,964,290 A | * 6/1934 | Krause | |
| 2,015,877 A | * 10/1935 | Thompson | |
| 3,675,526 A | * 7/1972 | Bush | 83/676 |
| 3,799,025 A | * 3/1974 | Tsunoda | 83/835 |
| 3,812,755 A | * 5/1974 | Danielsen | 83/835 |
| 3,990,338 A | * 11/1976 | Wikner et al. | 83/835 |
| 4,102,230 A | * 7/1978 | Magnusson et al. | 83/835 |
| 4,106,382 A | * 8/1978 | Salje et al. | 83/835 |
| 4,187,754 A | * 2/1980 | Beaty | 83/847 |
| 4,201,103 A | * 5/1980 | Salje et al. | 83/835 |
| 4,867,025 A | * 9/1989 | Eklof et al. | 83/835 |
| 5,033,579 A | * 7/1991 | Vanderstraeten | 181/208 |
| 5,078,035 A | 1/1992 | Moller et al. | |
| 5,802,947 A | * 9/1998 | Ward, Jr. et al. | 83/835 |
| 6,158,323 A | * 12/2000 | Asada | 83/835 |

FOREIGN PATENT DOCUMENTS

| | | | |
|---|---|---|---|
| JP | 355120927 | * | 9/1980 |
| JP | 402103101 | * | 4/1990 |
| JP | H10-286775 A | | 10/1998 |
| KR | 10-1998-0032841 A | | 3/2000 |
| KR | 10-2000-0025865 A | | 5/2000 |
| KR | 10-2000-0054871 A | | 9/2000 |

* cited by examiner

Primary Examiner—Derris H. Banks
Assistant Examiner—Jamila Williams
(74) Attorney, Agent, or Firm—Christopher E. Blank, Esq.; Jaeckle Fleischmann & Mugel, LLP

(57) ABSTRACT

The present invention relates to an improvement of the conventional sandwiched type saw blade shank by providing, as the intermediate layer, a coated thin sheet with tens of electro-conductive points or a thin sheet with multiple contacts to enhance weldability and to minimize the thermal deform or pressed marks, so that sound absorption, noise reduction and also heat dissipation may be maximized during a high speed cutting operation. The invention provides a saw blade shank with cutting tips on the circumference of the shank, comprising two or more conductive steel plates (22,24) and coated thin sheet (30) as an intermediate layer inserted between the neighboring conductive steel plates, the coated thin sheet being coated so as to leave a plurality of uncoated areas (32$a$) on at least one of its surfaces, whereby the coated thin sheets (30) and the steel plates (22,24) are integrally combined by multi-contact thermal fusion through a predetermined high pressure and electric current concentrated on the uncoated areas (32$a$).

10 Claims, 7 Drawing Sheets

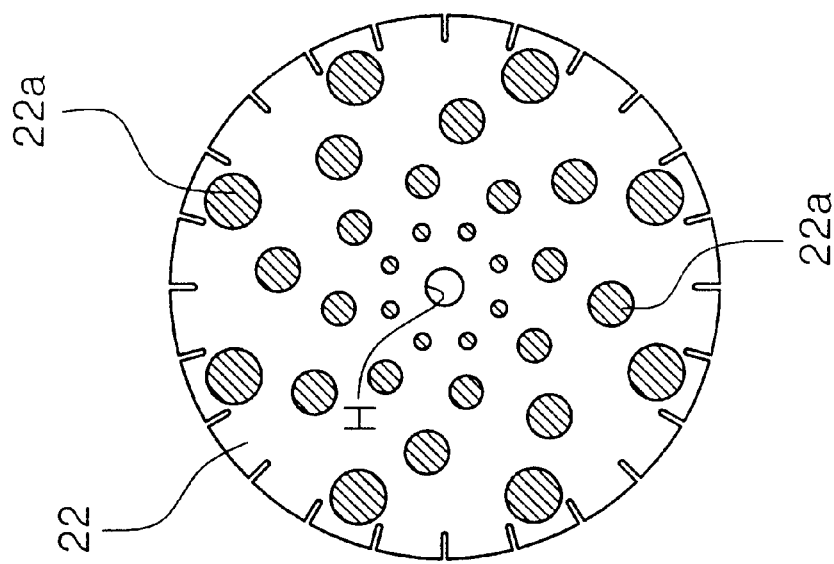
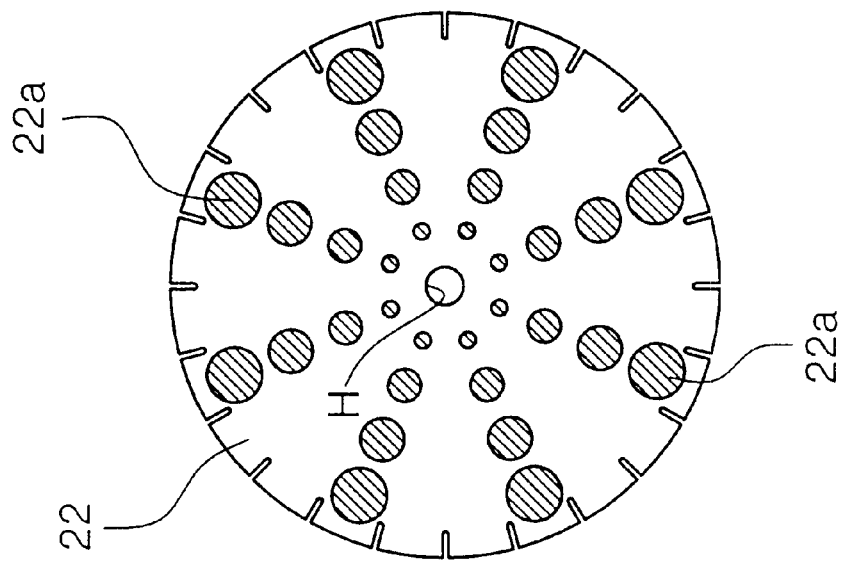

SAW BLADE SHANK

CROSS REFERENCE TO RELATED APPLICATIONS

This application claims the benefit of Korean Patent Application Serial No. 2001-8262, filed Feb. 19, 2001.

FIELD OF THE INVENTION

The present invention relates to a saw blade shank constituting the body of a diamond saw for cutting, for example, stones, with cutting tips provided on the circumference of the saw, and particularly to a saw blade shank which comprises two or more steel plates and a coated sheet having a plurality of electro-conductive points or multi-contact sheets inserted between the respective neighboring steel plates, to enhance the weldability and at the same time, to minimize the thermal deform or pressed marks, so that sound absorption, noise reduction and also heat dissipation may be maximized during a high speed cutting operation.

BACKGROUND OF THE INVENTION

Generally, the diamond saw blade for cutting stones performs cutting operation at a rotation speed of several thousand revolutions per minute (r.p.m.). The vibration and noise from the friction and impact generated at that time can a cause of inadvertent accidents, which represents a major environmental disruption around working places. Further, heat is generated at the saw shanks during high speed cutting operation to cause a thermal deformation of the shanks, which results in the decreased cutting efficiency and possibly safety problem due to wobble of shank.

To solve such a problem, from Korean unexamined patent publication No. 10-2000-0025865 there was known a saw blade shank consisting of two steel plates, between which an alloy sheet made of aluminum, nickel, copper or the like is fitted to reduce vibration and noise. However, this type of shanks is limited because of the difficulty in the manufacture and the high production cost.

Moreover, Korean unexamined patent publication No. 10-2000-005487 describes a method for manufacturing a sandwiched panel type circular saw blade shank of non-metal or plastic by using projection welding. In further particular, steel balls as fusible material are placed in the holes formed between parallel plastic plates and then electric current is supplied to the upper and lower electrodes with a compressive force applied to fuse the balls, whereby a low-noise saw blade shank is made. This method is, however, disadvantageous in that a fully appropriate joining strength is not often attained because the fusible material is not uniformly fused over the whole surface of a shank due to the variance in the characteristics of the supplied electric current caused by the possible size difference in the balls.

There is disclosed a still other technology, for example, in the Korean unexamined patent publication No. 10-1998-032841 and U.S. Pat. No. 5,078,035, in which holes with various shapes are formed on an ordinary saw blade shank to help dissipate the heat generated in cutting work and also to reduce the vibration of a saw. This method is also associated with the drawback on the ground that the holes are formed throughout the thickness of one sheet of shank and therefore the mechanical strength of the saw shank is so reduced as to cause the deformation of the shank by the mechanical load, beside the deformation due to thermal load, during a cutting operation. In addition, the dust or sludge generated during the cutting operation can scatter through the holes on shanks and harm the respiratory organs of workers, not to mention polluting the working sites.

In order to resolve the problem just described, the Japanese unexamined patent publication Hei 10-286775 describes an arrangement consisting of three or more plates including intermediate steel layers with the layer thickness of about 0.2 to 0.7 mm and having through-holes, the three or more plates being joined by spot welding. While the holes in the intermediate layer are intended to function as an absorber of the dust and noise and as a heat dissipater, the steel substrate of the shank is not so high in the heat conductivity and the effect of damping noise by the holes is not so excellent as well.

SUMMARY OF THE INVENTION

The present invention is to resolve the problems with the conventional art as described above and the object of the invention is to improve the conventional saw blade shank of sandwiched type by providing, as the intermediate layer, a coated thin sheet with a plurality of electro-conductive points or a thin sheet with multiple contacts to enhance weldability and to minimize the thermal deform or pressed marks, so that sound absorption, noise reduction and also heat dissipation may be maximized during a high speed cutting operation.

The object as described above is achieved according to an aspect of the invention by a saw blade shank with cutting tips on the circumference of the shank, comprising two or more conductive steel plates and a coated thin sheet as a intermediate layer inserted between the neighboring conductive steel plates, the coated thin sheet being coated so as to leave a plurality of uncoated areas on at least one of its surfaces, whereby the coated thin sheet and the steel plates (22,24) are integrally combined by multi-contact thermal fusion through a predetermined high pressure and electric current concentrated on the uncoated areas.

The object as described above is also achieved according to another aspect of the invention by a saw blade shank with cutting tips on the circumference of the shank, comprising two or more conductive steel plates and multi-contact thin sheets each having plural projections on one or both sides of the thin sheet, inserted between the neighboring steel plates, whereby the multi-contact thin sheets and the steel plates are integrally combined by multi-contact thermal fusion through a predetermined high pressure and electric current concentrated on the plural projections.

DESCRIPTION OF THE PREFERRED EMBODIMENTS

Preferred embodiments of the invention will be described in detail below by referring to the accompanying drawings.

Figure 1:
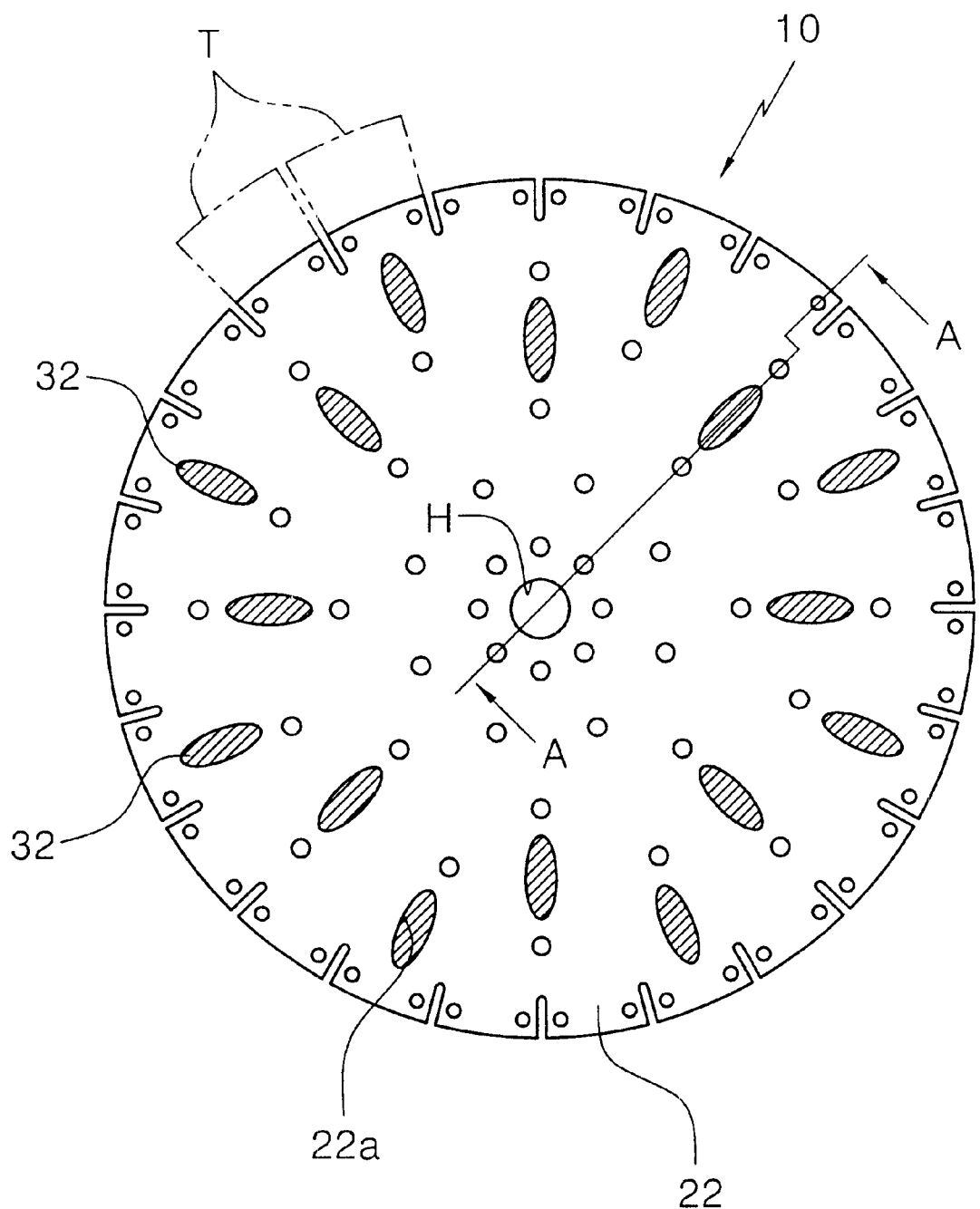
FIG. 1 shows the plan view of a saw blade shank according to an embodiment of the invention.
Figure 2:
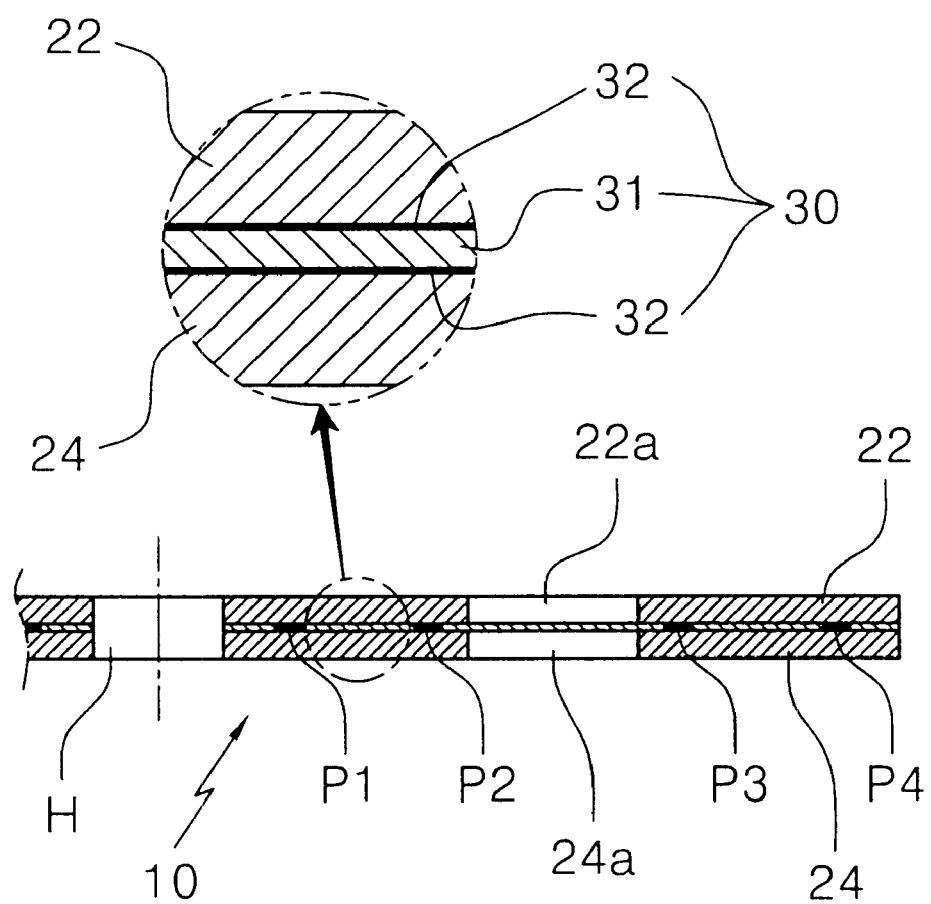
FIG. 2 shows the enlarged view of the cross section along A—A line in FIG. 1, FIGS. 3a to 3f show various arrangements of heat dissipating holes formed on a saw blade shank.

As shown in FIGS. 1 and 2, the saw blade shank 10 for cutting purpose according to the invention comprises two conductive steel plates 22 and 24 and a coated thin sheet 30 as an intermediate layer inserted between the steel plates 22 and 24 and welded at multiple points to the steel plates. The portions represented by the two-dot chain line in FIG. 1 shows diamond cutting tips T provided on the circumference of a saw blade shank 10.

The steel plates 22 and 24 are formed with a multitude of heat dissipating holes 22a and 24a, for example, to promote dissipation of the frictional heat generated during cutting hard materials like stones. The shape of a hole, which is elliptical in FIG. 1, and the arrangement of the holes on the plates can be various to achieve the desired purpose, as shown in FIGS. 3a to 3f.

Figure 3D:
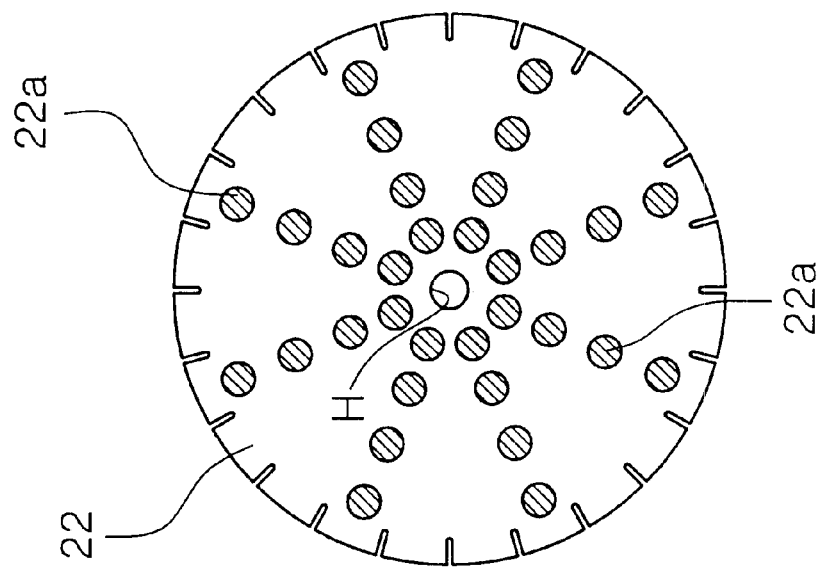
Figure 3C:
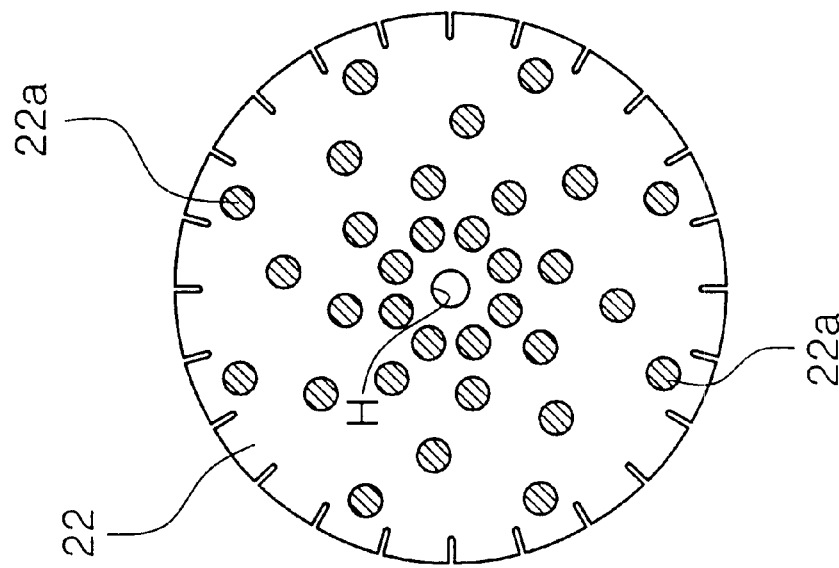
Figure 3F:
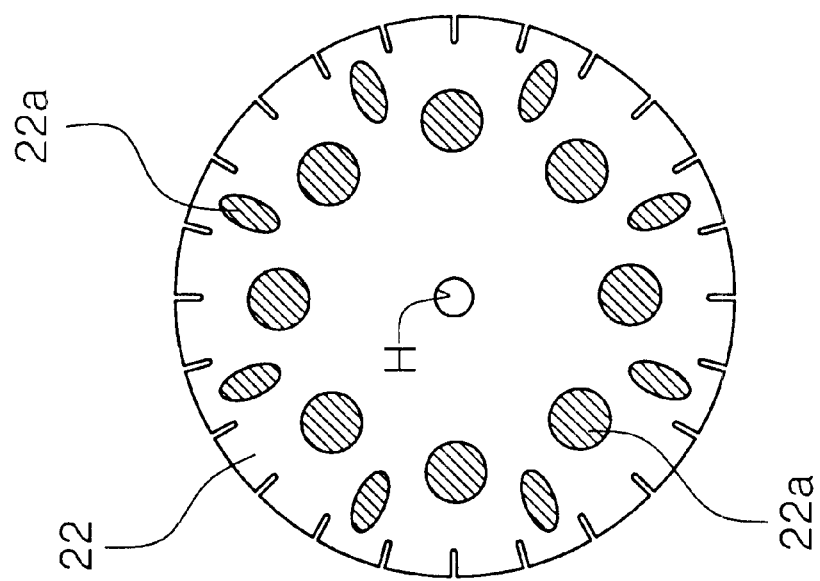
Figure 3E:
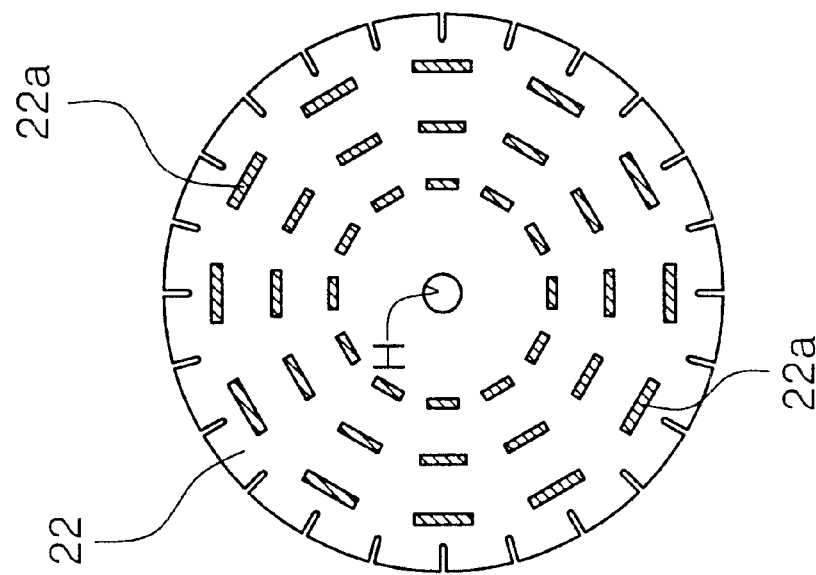

In particular, the heat dissipating holes 22a in a circular form shown in FIG. 3a are aligned in radial straight lines, with the size of holes increasing with the distance from the center of the shank. FIG. 3b shows heat dissipating holes 22a which have each the form of circle and are arranged in helixes, with the diameter of holes increasing stepwise radially from the center of the shank, FIG. 3c shows heat dissipating holes 22a which are in the form of circles with same size and are arranged in several helixes in a similar manner as in FIG. 3b, and FIG. 3d shows heat dissipating holes 22a which are in the form of the circles with the same diameter and are arranged in several radial lines. The heat dissipating holes 22a in FIG. 3e are in the form of long slits and arranged in concentric circles. The heat dissipating holes 22a in FIG. 3f are in the combined form of circle and ellipse and the holes of the same type are arranged offset to each other and concentric to the center of the shank.

The shape of a hole and the arrangement of the holes on the plates are not restricted to those described above and so can be different from them.

The symbol H stands for the receiving hole for the rotation shaft of a motor-operated tool not shown.

Figure 4:
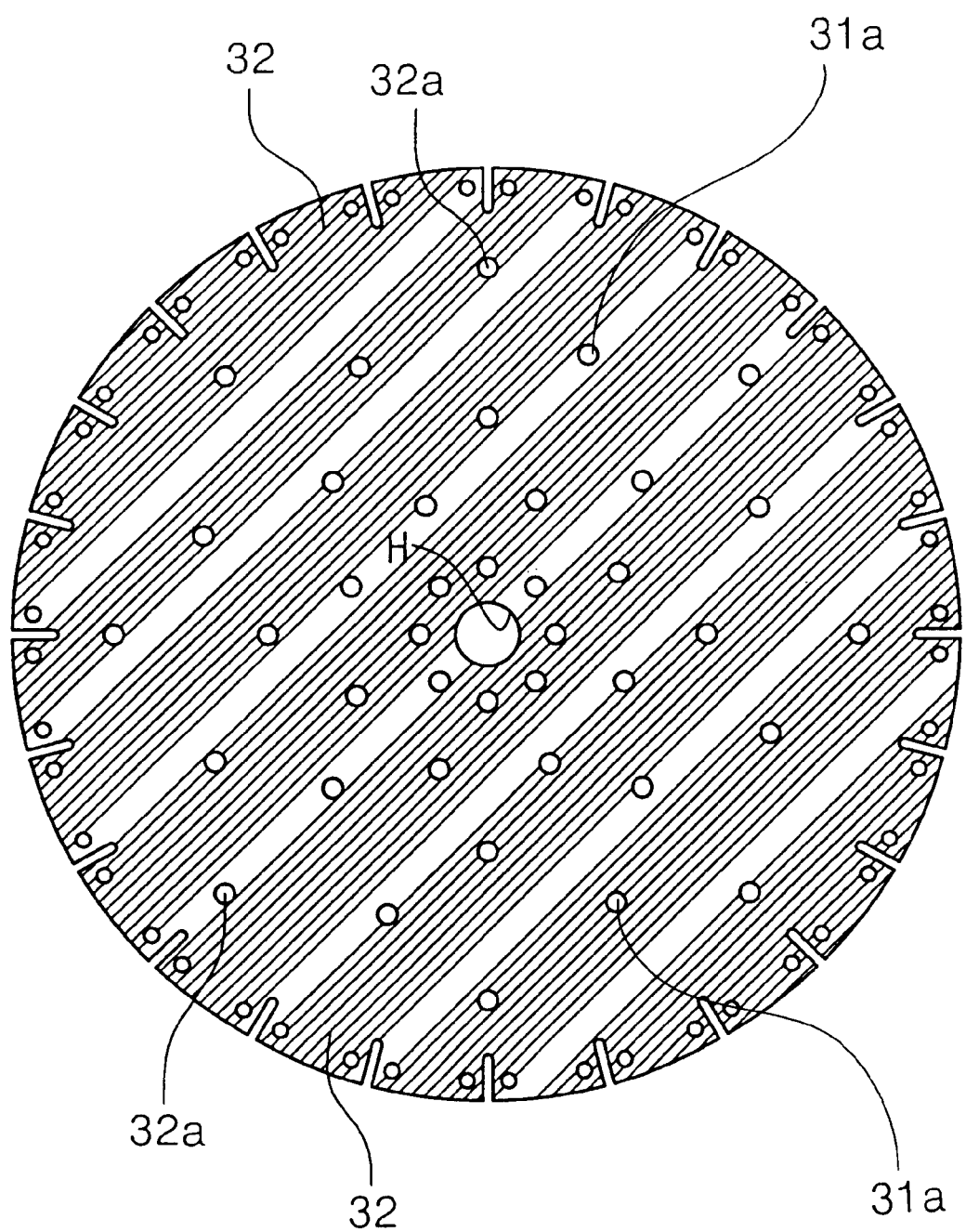
FIG. 4 shows the coated state of a coated thin sheet used in the invention, illustrating the locations for spot welding.

The coated thin sheet 30 comprises, as shown in FIGS. 2 and 4, a thin sheet 31 and coated layers 32 of insulating material provided on the opposite surfaces of the thin sheet, wherein a multitude of uncoated areas 32a are not provided with insulating material on the opposite surfaces of the thin sheet.

Further the coated thin sheet 30 may be formed with a multitude of through-holes 31a for maximized heat dissipation, wherein the holes 31a are preferably aligned with the heat dissipating holes 22a and 24a on the steel plates 22 and 24.

As the thin sheet 31, a sheet of copper, aluminum, nickel, copper, stainless steel or other alloys with the thickness up to 1 mm may be used.

As the insulating material as described above, one selected from the group consisting of various resins, particularly urethane, rubber and the like may be used and the thickness of the coated layer 32 of insulating material may lie in the range of 1 $\mu$m to 500 $\mu$m.

The methods for coating insulating materials may include spraying, silk screen process and the like, so that the uncoated areas 32a to serve as the conductive contacts may not be contaminated by the insulating material.

The plural uncoated areas 32a formed in the coated layer 32, where insulating material is not coated, function as the conductive positions for multi-contact spot welding to maximize the current density, wherein the positions for conductive spot welding are denoted as the symbols P1, P2, P3 and P4 in FIG. 2.

Therefore, after the coated thin sheet 30 as the intermediate plate is inserted into right place between the two steel plates 22 and 24, the electrodes are moved successively from one contact point to another to apply predetermined pressure and electric current from both sides of the steel plates, so that the spot welding may integrally combine the steel plates 22 and 24 and the coated thin sheet 30 by causing thermal fusion of the uncoated areas 32a.

While the embodiment as described above related to provision of insulation on both sides of a thin sheet 31, the present invention can be applied to the case of coated thin sheet, where the thin sheet 31 is provided, only on one surface, with insulated layer within which the uncoated areas free of insulating material are present.

For the embodiment of the invention as described above, as the current is concentrated on the conductive points or the holes 32a, it is found that the high electrical or thermal efficiency according to the invention can permit the welding current lower by more than 20% than that required in the case of welding an ordinary copper plate without insulating layer, where the welding current is dispersed. Thus, the excellence in the weldability becomes conspicuous in manufacturing saw blade shanks according to the invention.

Further, the thermal deformation and pressed marks on the saw blade shanks 10 can be minimized by welding plural contacts distributed over the plates with concentrated welding current.

When a saw blade shank 10 according to the invention which is provided with diamond cutting tips on the circumference of the shank, in other words, is completed as a saw blade, is put to use for a cutting operation, the maximum heat dissipation can be realized thanks to the plurality of heat dissipating holes 22a and 24a on the steel plates. The mechanical strength or rigidity of the shank is not appreciably reduced because of the relatively low proportion of the hole areas and constructional feature, so the wobble phenomena due to cutting load can be prevented.

Because the coated thin sheet 30 includes the insulating layers 32 of one selected from the group consisting of various resins, particularly urethane, rubber and the like, the sound absorbing and noise reducing performance can be improved in cutting operation with the saw blade shank 10.

Figure 5A:
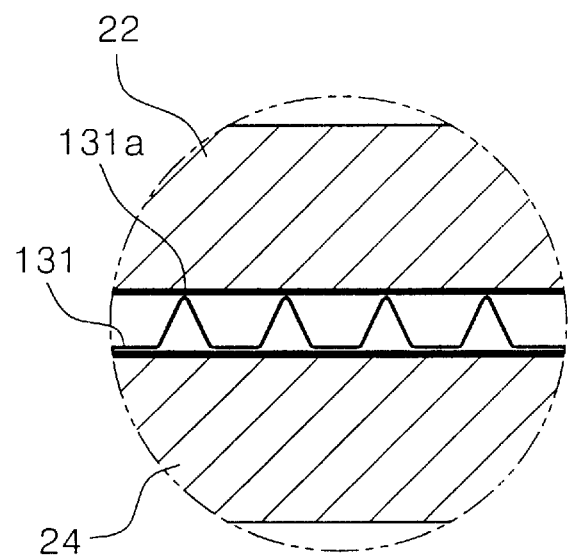
FIGS. 5a and 5b show the enlarged cross section of saw blade shanks according to other embodiments of the invention.
Figure 5B:
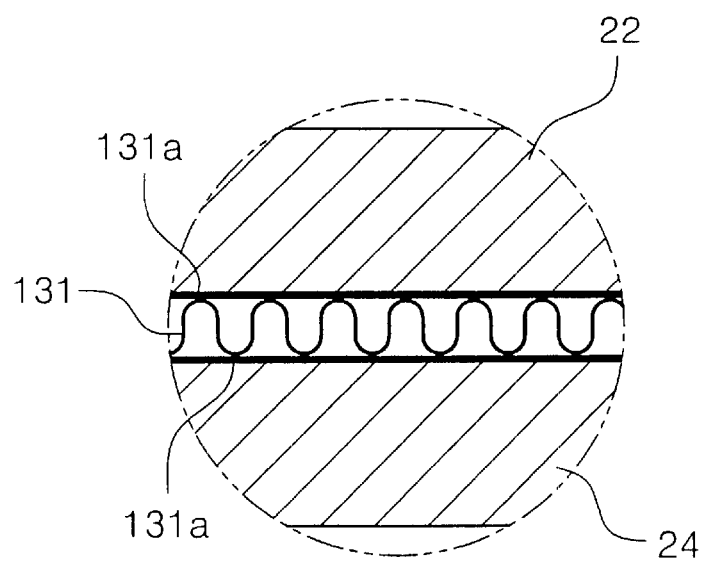

According to another embodiment of the invention, as shown in FIGS. 5a and 5b, a multi-contact thin sheet 131 with plural pointed or round projections 131a on one or both sides is inserted between the neighboring steel plates 22 and 24, so that the plural projections 131a may be thermally fused by a predetermined pressure and concentrated current to yield an integrated saw blade shank. In these embodiments, the multi-contact thin sheet 131 may be further formed with the heat dissipating holes 22a and 24a as illustrated in FIGS. 3a to 3f as in the earlier embodiment.

Although a saw blade shank having two steel plates and one intermediate thin sheet has been described in connection with the accompanying drawings, the invention is not restricted to it and may be applied to a saw blade shank having more than two steel plates and more than one intermediate thin sheet.

What is claimed is:

1. A saw blade shank with cutting tips on the circumference of the shank, comprising two or more conductive steel plates (22,24) and a coated thin sheet (30) as an intermediate layer adjacently inserted between the neighboring conductive steel plates, the coated thin sheet being coated so as to leave a plurality of uncoated areas (32a) on at least one of its surfaces, whereby the coated thin sheet (30) and the conductive steel plates (22,24) are integrally combined by multi-contact thermal fusion through a predetermined high pressure and electric current concentrated on the uncoated areas (32a).

2. A saw blade shank according to claim 1, wherein said conductive steel plates (22,24) are each formed with a plurality of heat dissipating holes (22a, 24a).

3. A saw blade shank according to claim 1, wherein said coated thin sheet (30) includes a thin sheet (31) having the thickness of less than 1 mm and made of a material selected from the group consisting of copper, aluminum, stainless steel and other alloys.

4. A saw blade shank according to claim 1, wherein said coated thin sheet (30) is formed with a plurality of holes (31a) in the aligned position with heat dissipating holes (22a,24a) to maximize heat dissipation.

5. A saw blade shank according to claim 1, wherein the material (32) coated on the coated thin sheet (30) is selected from the group consisting of synthetic resins and rubbers.

6. A saw blade shank according to claim 1, wherein the material (32) coated on the coated thin sheet (30) is coated within to 1 to 500 µm.

7. A saw blade shank according to claim 2, wherein said heat dissipating holes (22a,24a) are in the form of circle, ellipse, rectangle, other shape or a combination of them.

8. A saw blade shank with cutting tips on the circumference of the shank, comprising two or more conductive steel plates (22,24) and multi-contact thin sheet (131) each having plural projections (131a) on one or both sides of the multi-contact thin sheet (131), inserted adjacently between the conductive steel plates (22,24), whereby the multi-contact thin sheet (131) aligned the conductive steel plates (22,24) are integrally combined by multi-contact thermal fusion through a predetermined high pressure and electric current concentrated on the plural projections (131a).

9. A saw blade shank according to claim 8, wherein said conductive steel plates (22,24) are each formed with a plurality of heat dissipating holes (22a, 24a).

10. A saw blade shank according to claim 9, wherein said heat dissipating holes (22a,24a) are in the form of circle, ellipse, rectangle, other shape or a combination of them.

* * * * *